United States Patent
Heink et al.

(10) Patent No.: US 7,643,525 B2
(45) Date of Patent: Jan. 5, 2010

(54) CURRENT DRIVER AND POWER CONTROL FOR ELECTROPHOTOGRAPHIC DEVICES

(75) Inventors: Philip Jerome Heink, Lexington, KY (US); Daniel Richard Klemer, Lexington, KY (US); Stanley Coy Tungate, Jr., Lexington, KY (US); Eric Wayne Westerfield, Versailles, KY (US)

(73) Assignee: Lexmark International, Inc., Lexington, KY (US)

( * ) Notice: Subject to any disclaimer, the term of this patent is extended or adjusted under 35 U.S.C. 154(b) by 104 days.

(21) Appl. No.: 11/930,481

(22) Filed: Oct. 31, 2007

(65) Prior Publication Data

US 2009/0110015 A1    Apr. 30, 2009

(51) Int. Cl.
*H01S 3/00*    (2006.01)

(52) U.S. Cl. .............. 372/38.07; 372/38.02; 372/38.01; 372/29.015; 372/29.011; 372/29.01

(58) Field of Classification Search .............. 372/38.07, 372/38.02, 38.01, 29.015, 29.011, 29.01
See application file for complete search history.

(56) References Cited

U.S. PATENT DOCUMENTS

| | | | |
|---|---|---|---|
| 5,027,362 A | 6/1991 | Hokanson et al. | |
| 5,138,623 A | 8/1992 | Ema et al. | |
| 5,568,464 A * | 10/1996 | Horie | 369/116 |
| 5,651,017 A | 7/1997 | Genovese | |
| 6,370,175 B1 * | 4/2002 | Ikeda et al. | 372/38.1 |
| 6,917,639 B2 | 7/2005 | Ishida et al. | |

OTHER PUBLICATIONS

U.S. Appl. No. 11/466,195, filed Aug. 22, 2006, Heink et al.

* cited by examiner

*Primary Examiner*—Minsun Harvey
*Assistant Examiner*—Kinam Park

(57) ABSTRACT

A laser driver comprises a plurality of current sources, including at least one bias current source and at least two drive current sources. To control the laser driver, a set of operating states is defined where each operating state corresponds to a desired laser output power level and a ratio is defined that establishes a relationship between a first desired laser output and a second desired laser output. A calibration operation samples laser output power of the laser source for less than all of the operating states, computes adjustments to the current levels of the current sources based at least in part upon the ratio such that sampled laser power levels converge towards their corresponding desired laser output level. The current sources are adjusted to their corresponding computed current levels.

20 Claims, 8 Drawing Sheets

Current vs. Time

Power vs. Time excellent# CURRENT DRIVER AND POWER CONTROL FOR ELECTROPHOTOGRAPHIC DEVICES

CROSS REFERENCE TO RELATED APPLICATIONS

The present application is related to U.S. patent application Ser. No. 11/466,195, entitled "Current Driver And Power Control For Electrophotographic Devices", which is hereby incorporated by reference.

BACKGROUND OF THE INVENTION

The present invention relates to electrophotographic devices, and in particular, to current driver circuits and methods of controlling current driver circuits in electrophotographic devices.

In electrophotography, an imaging system forms a latent image by exposing select portions of an electrostatically charged photoconductive surface to laser light. For example, the imaging system may sweep a laser beam across the photoconductive surface in a scan direction as the photoconductive surface advances in a process direction that is orthogonal to the scan direction. For each sweep of the beam, a corresponding laser is modulated to write a plurality of print elements (Pels). Essentially, the density of the electrostatic charge on the photoconductive surface is altered in areas exposed to the laser beam relative to those areas unexposed to the laser beam, thus forming a latent image on the photoconductive surface in a manner that corresponds with associated image data. The latent electrostatic image thus created is developed into a visible image by exposing the photoconductive surface to toner, which contains pigment components and thermoplastic components. When so exposed, the toner is attracted to the photoconductive surface in a manner that corresponds to the electrostatic density altered by the laser beam.

The toner pattern is subsequently transferred from the photoconductive surface to the surface of a print substrate, such as paper, which has been given an electrostatic charge opposite that of the toner. A fuser assembly then applies heat and pressure to the toned substrate before the substrate is discharged from the apparatus. The applied heat causes constituents including the thermoplastic components of the toner to flow into the interstices between the fibers of the medium and the applied pressure promotes settling of the toner constituents in these voids. The toner solidifies as it cools adhering the image to the substrate.

Due to inherent imprecision in the imaging system, the swept beam may have bow and/or skew in its scan path. Moreover, there may be nonlinearity in the spacing between adjacent Pels due to imprecision in the imaging system optics. To compensate for such scanning errors, it is known to subdivide each Pel into a plurality of slices, i.e., subPels. During printing operations, the imaging system attempts to compensate for scanning errors by selectively controlling the number of slices per Pel and/or selectively controlling for each Pel, which slices the laser beam is modulated ON and which slices the laser beam is modulated OFF. However, as scan rates increase, e.g., due to increased printed page rates, the time available to the imaging system to write each slice of each Pel decreases. This places a burden on the imaging system, including the video control functions, the data transmission paths, and the laser diode driver(s) to reliably produce the short video pulse Pel slices.

BRIEF SUMMARY OF THE INVENTION

According to an aspect of the present invention, a method of controlling a printhead comprises providing a laser source, providing a plurality of current sources coupled to the laser source including at least a bias current source, a first drive current source and a second drive current source and defining a set of operating states where each operating state corresponds to a desired laser output power level set by driving the laser source using a corresponding combination of the plurality of current sources. The method further comprises setting a ratio that establishes a relationship between a first one of the desired laser output power levels and a second one of the desired laser output power levels, performing a calibration operation and adjusting the plurality of current sources including the bias current source, the first drive current source and the second drive current source to their corresponding computed current levels.

The calibration operation my be performed by sampling actual laser output power of the laser source for less than all of the operating states in the set and computing adjustments to the current levels of the plurality of current sources such that the current level of the second drive current source relates to the current level of the first drive current source based upon a function of the ratio. The calibration is further configured such that for each operating state that is sampled, the sampled laser power level converges towards a corresponding one of the desired laser output power levels associated with that sampled operating state.

According to another aspect of the present invention, a system for controlling a printhead comprises a laser source, a plurality of current sources coupled to the laser source including at least a bias current source, a first drive current source and a second drive current source, and a controller that controls the plurality of current sources during imaging operations to write print elements corresponding to associated image data and a set of operating states where each operating state corresponds to a desired laser output power level set by driving the laser source using a corresponding combination of the plurality of current sources.

The system performs a calibration operation during a non-printing portion of a scan operation that samples actual laser output power of the laser source for less than all of the operating states in the set and computes adjustments to the current levels of the plurality of current sources such that the current level of the second drive current source is a ratiometric function of the current level of the first drive current source and for each operating state that is sampled. The calibration is configured such that the sampled laser power level converges towards a corresponding one of the desired laser output power levels associated with that sampled operating state. The controller then adjusts the plurality of current sources including the bias current source, the first drive current source and the second drive current source to their corresponding computed current levels.

According to yet a further aspect of the present invention, a control system for controlling laser power in a printhead comprises a first memory for storing a set of operating states where each operating state corresponds to a stored value designating a desired laser output power level set by driving a laser source using a corresponding combination of current sources selected from a plurality of current sources including at least a bias current source, a first drive current source and a second drive current source. A processor further performs a calibration operation that requests samples of actual laser output power of the laser source for less than all of the operating states in the set, stores received sample data in a second memory and computes adjustments to the current levels of the plurality of current sources such that the current level of the second drive current source is a ratiometric function of the current level of the first drive current source. The calibration operation is configured such that for each operating state that is sampled, the stored sample data in the second memory converges towards a corresponding one of the desired laser output power levels associated with that sampled operating state. The control system further outputs a control signal to adjust the plurality of current sources including the bias current source, the first drive current source and the second drive current source to their corresponding computed current levels.

BRIEF DESCRIPTION OF THE SEVERAL VIEWS OF THE DRAWINGS

The following detailed description of the preferred embodiments of various embodiments of the present invention can be best understood when read in conjunction with the following drawings, where like structure is indicated with like reference numerals, and in which.

DETAILED DESCRIPTION OF THE INVENTION

In the following detailed description of the illustrated embodiments, reference is made to the accompanying drawings that form a part hereof, and in which is shown by way of illustration, and not by way of limitation, specific embodiments in which the invention may be practiced. It is to be understood that other embodiments may be utilized and that changes may be made without departing from the spirit and scope of various embodiments of the present invention.

An Exemplary Electrophotographic Imaging Apparatus

Figure 1:
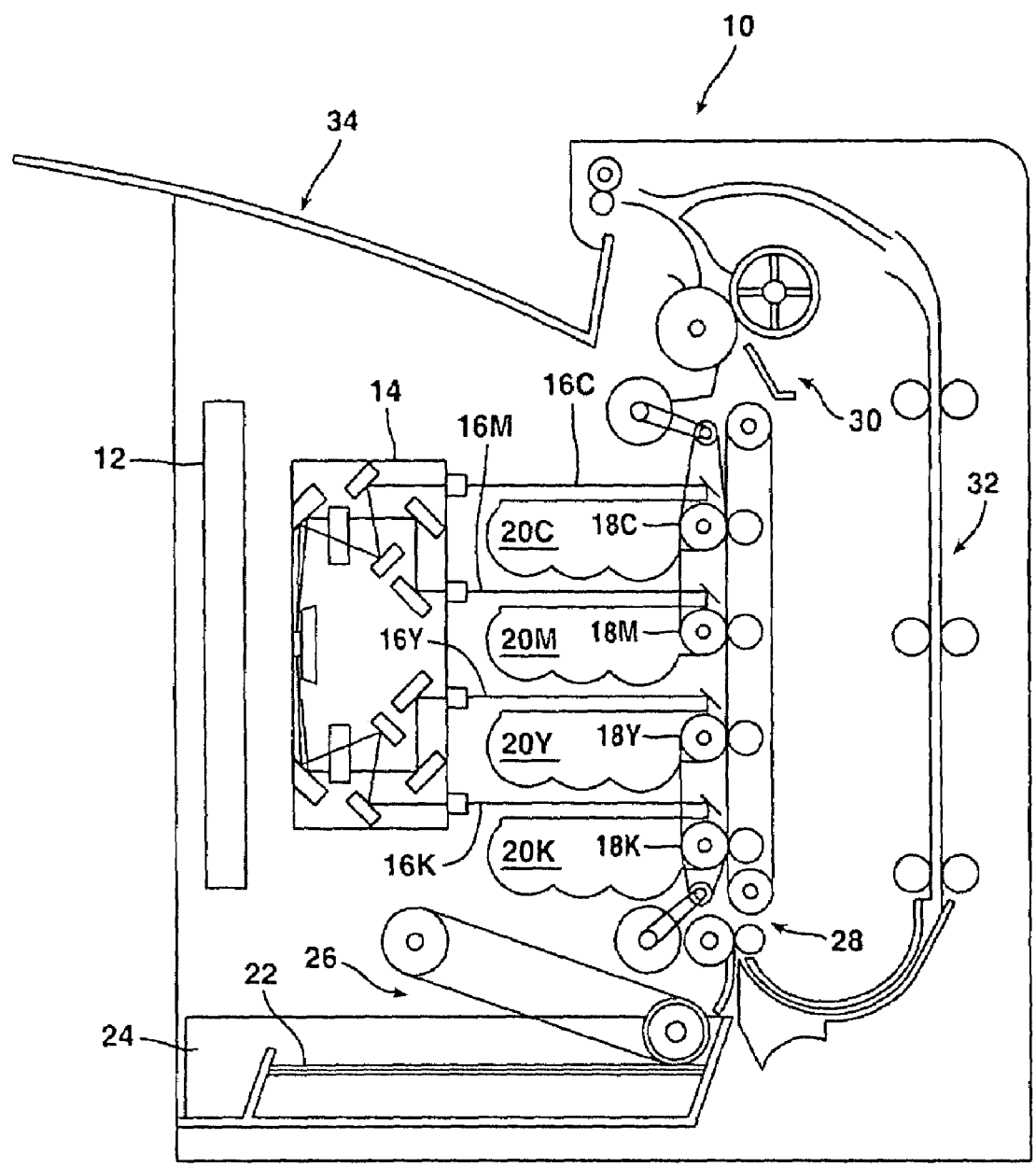
FIG. 1 is a schematic illustration of an exemplary electrophotographic apparatus.

Referring now to the drawings, and particularly to FIG. 1, an apparatus, which is indicated generally by the reference numeral 10 is illustrated for purposes of discussion herein as a color laser printer. An image to be printed is electronically transmitted to a main system controller 12 by an external device (not shown). The main system controller 12 includes system memory, one or more processors, and other software and/or hardware logic necessary to control the functions of electrophotographic imaging.

For color operation, the image to be printed is de-constructed into four bitmap images, each corresponding to an associated one of the cyan, yellow, magenta and black (CYMK) image planes, e.g., by the main system controller 12 or by the external device. The main system controller 12 then initiates an imaging operation whereby a printhead 14 outputs first, second, third and fourth modulated laser beams 16K, 16Y, 16M and 16C respectively.

The first modulated laser beam 16K forms a latent image on a photoconductive drum 18K of a first image forming station 20K based upon the bitmap image data corresponding to the black image plane. The second modulated laser beam 16Y forms a latent image on a photoconductive drum 18Y of a second image forming station 20Y based upon the bitmap image data corresponding to the yellow image plane. The third modulated laser beam 16M forms a latent image on a photoconductive drum 18M of a third image forming station 20M based upon the bitmap image data corresponding to the magenta image plane. Similarly, the fourth modulated laser beam 16C forms a latent image on a photoconductive drum 18C of a fourth image forming station 20C based upon the bitmap image data corresponding to the cyan image plane. During the imaging operation, each modulated laser beam 16K, 16Y, 16M, 16C sweeps across its corresponding photoconductive drum 18K, 18Y, 18M and 18C in a scan direction that is perpendicular to the plane of FIG. 1.

The main system controller 12 also coordinates the timing of a printing operation to correspond with the imaging operation, whereby a top sheet 22 of a stack of media is picked up from a media tray 24 by a pick mechanism 26 and is delivered to a media transport belt 28. The media transport belt 28 carries the sheet 22 past each of the four image forming stations 20K, 20Y, 20M and 20C, which apply toner to the sheet 22 in patterns corresponding to the latent images written to their associated photoconductive drums 18K, 18Y, 18M and 18C. The media transport belt 28 then carries the sheet 22 with the toned mono or composite color image registered thereon to a fuser assembly 30. The fuser assembly 30 includes a nip that applies heat and pressure to adhere the toned image to the sheet 22. Upon exiting the fuser assembly 30, the sheet 22 is either fed into a duplexing path 32 for printing on a second surface thereof, or the sheet 22 is ejected from the apparatus 10 to an output tray 34.

An Exemplary Printhead

Figure 2:
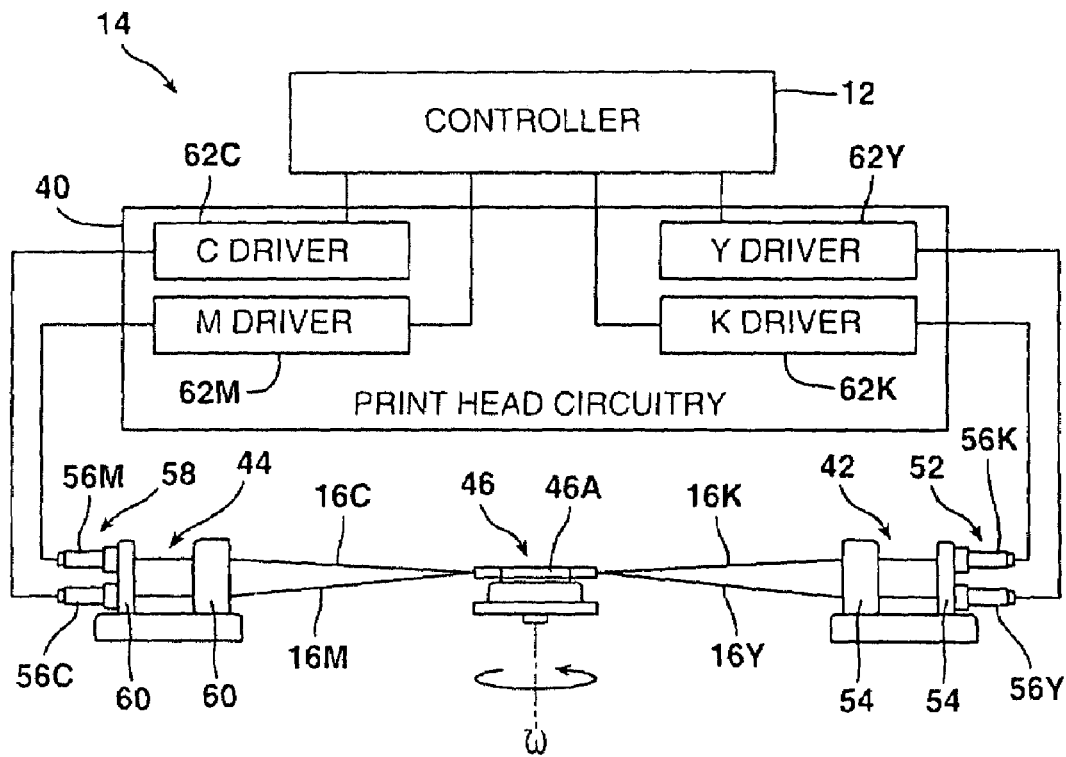
FIG. 2 is a block diagram of select components of an exemplary printhead, which may be utilized with the device of FIG. 1, illustrating laser sources coupled to corresponding circuitry.

Referring to FIG. 2, an exemplary printhead 14 includes generally, printhead circuitry 40 that is communicably coupled to the controller 12 for exchange of image data and control data between the printhead 14 and the controller 12, first and second pre-scan assemblies 42, 44, a rotating polygon mirror 46 having a plurality of facets 46A and a post scan optical system having one or more post scan optical components (not shown in FIG. 2).

The first pre-scan assembly 42 comprises a first laser assembly 52 and a first pre-scan optical system 54. As illustrated, the first laser assembly 52 comprises a first pair of laser sources including a first laser source 56K that is associated with the black image plane and a second laser source 56Y that is associated with the yellow image plane. Similarly, the second pre-scan assembly 44 comprises a second laser assembly 58 and a second pre-scan optical system 60. The second laser assembly 58 comprises a second pair of laser sources including a third laser source 56M that is associated with the magenta image plane and a fourth laser source 56C that is associated with the cyan image plane. The first, second, third and fourth laser sources 56K, 56Y, 56M, 56C may each be implemented, for example, using a laser diode or other suitable light source.

The first and second pre-scan optical systems 54, 60 each comprise one or more collimating lenses, pre-scan lenses and/or other optical system components as the specific implementation requires to direct and focus each of the modulated beams 16K, 16Y, 16M and 16C emitted by their associated first, second, third and fourth laser sources 56K, 56Y, 56M, 56C towards the polygon mirror 46.

The printhead circuitry 40 comprises a first driver circuit 62K that is coupled to the first laser source 56K, a second driver circuit 62Y that is coupled to the second laser source 56Y, a third driver circuit 62M that is coupled to the third laser source 56M, and a fourth laser driver 62C that is coupled to the fourth laser source 56C.

During an imaging operation, the polygon mirror 46 is controlled to rotate at a fixed rotational velocity ($\omega$) and each light source 56K, 56Y, 56M and 56C is driven to emit a modulated beam 16K, 16Y, 16M and 16C corresponding to its associated one of the CYMK image data, which is communicated from the controller 12 to associated drivers 62K, 62Y, 62M, 62C on the printhead circuitry 40. The first pair of beams 16K, 16Y each strike a first one of the facets of the polygon mirror and the second pair of beams 16M, 16C each strike a second one of the facets that is different from the first one of the facets. A scan line is formed each time a new facet intercepts its pair of beams.

Post scan optics are used to direct each modulated beam 16K, 16Y, 16M, 16C to their corresponding photoconductive drum 18K, 18Y, 18M and 18C as best illustrated in FIG. 1 The post scan optical components may each be provided as part of the printhead 14 or such components may be otherwise mounted within the apparatus 10.

Although FIGS. 1-2 illustrate an exemplary multi-beam printhead and corresponding apparatus, other configurations may alternatively be implemented. For example, the photoconductive drums 18K, 18Y, 18M and 18C may be replaced with a photoconductive belt or other types of photoconductive surface(s). Moreover, the photoconductive surface(s) may transfer the toned image to an intermediate device such as an electrically conductive intermediate transport belt that subsequently carries the toned image to the sheet 22. As another example, a single photoconductive surface may be used to image each color plane in sequential processing steps. Also, while a single printhead 14 is illustrated, a separate printhead may alternatively be provided for each image forming station 20K, 20Y, 20M and 20C. Additionally, other printhead and optical system configurations may be implemented, including providing a separate printhead for each laser source.

The Optical Scanner

The overall print quality of the apparatus 10 is sensitive to the optical output of the laser sources 56k, 56Y, 56M, 56C. However, optical power requirements are known to vary widely, e.g., as much as 100% or more, from laser diode to laser diode. To account for such variations, each laser driver circuit 62K, 62Y, 62M, 62C of the printhead circuitry 40 comprise power management circuitry, which is described in detail below.

Laser Control Topology

Figure 3:
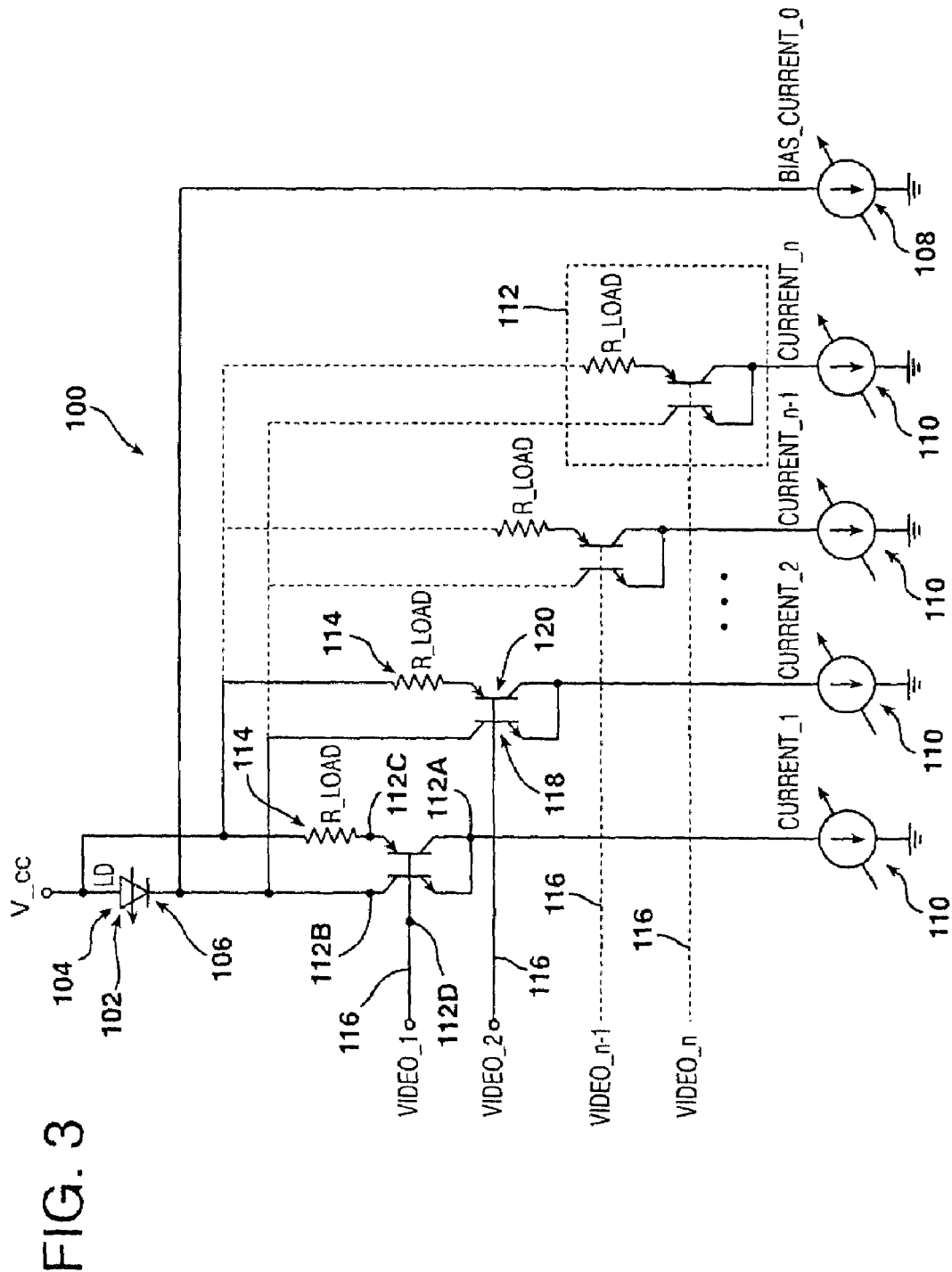
FIG. 3 is a schematic illustration of a switched current driver for a laser source that may be utilized in an electrophotographic device.

Referring to FIG. 3, a generalized topology 100 is illustrated for control of a laser source in an electrophotographic device, such as the apparatus 10. The generalized topology 100 comprises a laser source 102, e.g., a conventional laser diode having an anode 104 and a cathode 106. The anode 104 of the laser diode 102 is tied to a supply voltage, designated as V_cc. The topology 100 further includes a plurality of current sources coupled to the laser source 102. For example, as shown, there are one or more bias sources 108, (one bias source is shown for clarity of discussion) and two or more switched drive sources 110 (labeled Current_1 through Current_n as shown). Each bias source 108 may be fixed or programmable in current drive and is tied to the cathode 106 of the laser diode 102.

Each switched drive current source 110 may be fixed or programmable in drive current, e.g., to accommodate changing device characteristics, and is coupled to the cathode 106 of the laser source 102 through a corresponding switch 112. As shown, each switch 112 comprises a first terminal 112A coupled to a corresponding switched drive current source 110, a second terminal 112B coupled to the cathode 106 of the laser source 102, a third terminal 112C coupled to V_cc through a load resistor 114 (designated R_LOAD) and a control terminal 112D that is coupled to a corresponding control signal line 116.

As schematically represented, a complimentary pair of semiconductor devices forms each switch 112. In particular, each switch 112 is shown as an npn transistor 118 and a pnp transistor 120. The base of the npn and pnp transistors 118, 120 each couple to their corresponding control signal line 116. The emitter of the npn transistor 118 and the collector of the pnp transistor 120 each couple to the corresponding current source 110. The collector of the npn transistor is coupled to the cathode 106 of the laser diode 102 and the emitter of the pnp transistor 120 is coupled to the load resistor 114, which is further coupled to V_cc.

In operation of the switch 112, a first logic value, e.g., a voltage corresponding to V_cc, may be applied on a corresponding one of the control signal lines 116. This causes the switch 116 to enter a first state, wherein the first logic value turns ON the npn transistor 118 and turns OFF the pnp transistor 120. When the switch 112 is in the first state, the npn transistor 118 acts substantially like a short circuit, allowing the associated current source 110 to drive the laser diode 102. The pnp transistor acts substantially as an open circuit, thus having negligible effect on the laser diode 102.

Correspondingly, a second logic value, e.g., a voltage corresponding to 0V, may be applied to the corresponding control signal line 116. This causes the switch 112 to enter a second state, wherein the second logic value turns OFF the npn transistor 118 and turns ON the pnp transistor 120. When the switch 112 is in the second state, the npn transistor 118 acts substantially like an open circuit, thus the current source 116 does not draw significant current through the npn transistor 118. However, the pnp transistor 120 acts substantially like a closed circuit, thus the current source 110 sinks current through the pnp transistor and the load resistor 114. Thus, while the switch 112 is in the second state, the corresponding drive source 110 does not significantly contribute to the amount of current flowing through the laser diode 102.

The control signal line 116 of each drive current source 110 may be coupled to a corresponding unique control signal, e.g., from the controller 12. Thus, each drive current source 110 may be independently switched ON to contribute to the current applied to the laser diode 102, or switched OFF to not significantly contribute to the drive of current through the laser diode 102. Moreover, as will be described in greater detail below, one or more of the drive current sources 110 (and optionally one or more bias current sources 108) can have a programmable current capability.

The switches 112 may be implemented using any suitable switching structures. For example, the switches 112 may alternatively be constructed from field effect transistors (FETs), integrated circuit (IC) chips, or any suitable device that can implement a switching function, e.g., to steer the flow of current from a corresponding current source between the laser diode 102 and a corresponding dummy load, such as the load resistor 114 or other active or passive load.

As an example, assume a case where there is a single bias source 108 and two drive current sources 110, designated as Current_1 and Current_2. Current_1 is coupled to a first switch 112, which is controlled by a control signal VIDEO_1 on its control line 116 to switch Current_1 between the cathode of the laser diode 102 and its associated load resistor 114. Similarly, Current_2 is coupled to a second switch 112, which is controlled by a control signal VIDEO_2 on its control line 116 to switch Current_2 between the cathode 106 of the laser diode 102 and its associated load resistor 114. Further, assume that the current that is sunk by the bias current source 108 is Ibias, the current that is sunk by Current_1 is IC_1, the current that is sunk by Current_2 is IC_2 and the current drawn through the laser diode 102 is I_laser.

If VIDEO_1 and VIDEO_2 are both at a low logic level, then I_laser=Ibias.

If VIDEO_1 is at a high logic level and VIDEO_2 is at a low logic level, then I_laser=Ibias+IC_1

If VIDEO_1 is at a low logic level and VIDEO_2 is at a high logic level, then I_laser=Ibias+IC_2.

If VIDEO_1 and VIDEO_2 are both at a high logic level, then I_laser=Ibias+IC_1+IC_2.

The above exemplary set of equations for laser diode current I_laser is expandable to any number of bias current sources 108 and drive current sources 110.

Figure 4:
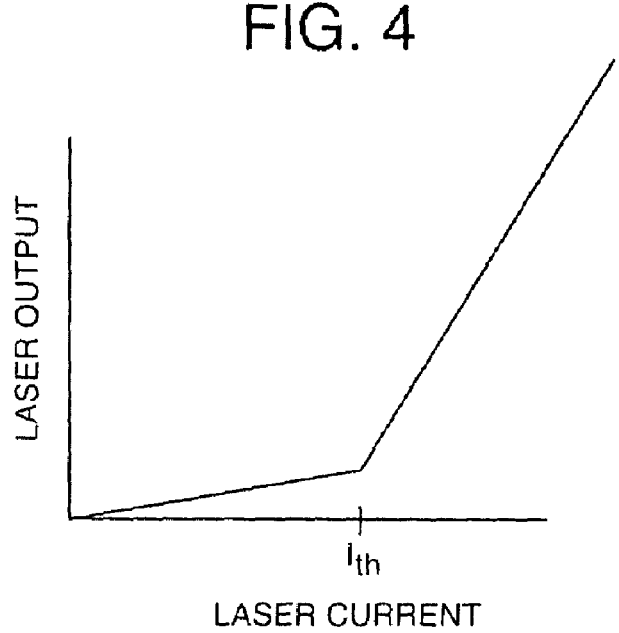
FIG. 4 is a chart of laser current vs. laser output power.

With reference to FIG. 4, a plot illustrates the relationship of light power output of the laser diode 102 as a function of the current that flows through the laser diode 102. As shown, the laser current along the axis of abscissa versus optical power along the axis of ordinate. As the current increases from zero, the laser diode 102 emits some low level of light that is proportional to the current flowing therethrough. At some level of current, the efficiency with which the laser diode emits light increases dramatically and the slope of the curve increases but remains generally constant at this larger slope value.

A minimum current of increased current efficiency, i.e., the current at which the slope discontinuity occurs, is referred to herein as the threshold current Ith. When the current being supplied to the laser diode is less than the threshold current Ith, atoms in the laser diode's cavity may be excited so as to cause light to be emitted similar to that produced by light emitting diodes (LEDs). However, the current supplied to the laser diode must reach a level greater than or equal to the threshold current Ith in order for the laser diode to enter a lasing mode of operation and thus emit laser light. The slope of the power curve above the threshold is referred to herein as the differential efficiency ($\eta$). In general, the determination of laser output power can be simplified to the expression:

$$p = \max\left(\frac{p_{th}i}{i_{th}}, (i - i_{th})\eta\right)$$

The threshold current, differential efficiency and power at the threshold generally change as a function of temperature and the age of the laser diode device. Moreover, the above parameters can vary from laser diode to laser diode.

A set of operating states may be defined where each operating state corresponds to a desired laser output power level set by driving the laser source using a corresponding combination of the plurality of current sources. For example, referring back to the previous example with reference to FIG. 3, including a single bias source 108 and two drive current sources 110, designated as Current_1 and Current_2, assume that a first operating state corresponds to a first desired laser power when the bias source is on, VIDEO_1 is active and VIDEO_2 is inactive thus providing a laser output power of $p_1$ Assume that a second operating state corresponds to a second desired laser power when the bias source is one, VIDEO_2 is active and VIDEO_1 is inactive, thus providing a laser output power of $p_2$. Still further, assume that a third operating state corresponds to a third desired laser power when the bias source is on and VIDEO_1 and VIDEO_2 are both active, thus providing a laser output power of $p_3$. Further, assume that laser power $p_1$, $p_2$ and $p_3$ are above the threshold current Ith. The magnitudes of the two drive current sources 110, Current_1 and Current_2, can be described as follows:

$$p_1 = (i_1 + i_B - i_{th})\eta$$

$$p_2 = (i_2 + i_B - i_{th})\eta$$

$$p_3 = (i_1 + i_2 + i_B - i_{th})\eta$$

where $i_1$ is the current from source Current_1, $i_2$ is the current from source Current_2, $i_B$ is the current from the bias current source 108 and $i_{th}$ is the threshold current.

Further, assume that R is a ratio that establishes a ratiometric function of two or more operating states within a set of states. For example, R may correspond to a relationship between a first one of the desired laser output levels and a second one of the laser output levels. With reference back to the preceding example, further assume that R is equal to a ratio of two desired levels of laser power such as $p_2$, corresponding to when VIDEO_2 is active and VIDEO_1 is inactive, and $p_1$, corresponding to when VIDEO_1 is active and VIDEO_2 is inactive. Thus:

$$R = p_2/p_1; \text{ and}$$

$$p_2 = Rp_1$$

In practice, any number of operating states may be defined for a given implementation, based upon factors such as the number of switched current sources, the number of needed operating states, etc. Moreover, where more than two switched current sources are used, more than one ratiometric function may be defined to further constrain the system by creating defined relationships between two or more operating states.

In order to determine the required magnitudes of the bias current, the current $i_1$ of the Current_1 source and the current $i_2$ of the Current_2 source for power $p_1$ and $p_2$ respectively, a requirement may be imposed that constrains the exemplary system so that the bias current $i_B$ is assumed to approximate the threshold current. If the bias current $i_B$ is set equal to the threshold current $i_{th}$, the ratio R also equals the ratio of the currents between when VIDEO_2 is active and VIDEO_1 is inactive and when VIDEO_1 is active and VIDEO_2 is inactive. Thus:

$$i_B = i_{th};$$

$$R = i_2/i_1; \text{ and}$$

$$i_2 = Ri_1$$

Further, under this arrangement when Current_1 and Current_2 are both ON, $p_3=p_1+p_2$ and $i_3=i_1+i_2$ According to an aspect of the present invention, a reference signal $r_1$ is defined, which corresponds to the desired laser signal power $p_1$ when VIDEO_1 is active and VIDEO_2 is inactive. Similarly, a reference signal $r_2$ is defined, which corresponds to the laser power $p_2$ level when VIDEO_2 is active and VIDEO_1 is inactive. Because the ratio of desired laser output power is fixed by definition and we have assumed that the bias current $i_B$ is set equal to the threshold current $i_{th}$, we can further assume that $i_1$ and $i_2$ are not independent. As such, only two error signals are needed to maintain control of the system. Given two current source magnitudes, $i_1$ and $i_2$, error signals corresponding to output power error measures can be calculated for each of two laser diode power levels as follows:

$$\epsilon_1 = p_1 - r_1 = (i_1 + i_B - i_{th})\eta - r_1$$

$$\epsilon_2 = p_2 - r_2 = (i_2 + i_B - i_{th})\eta - r_2 = (Ri_1 + i_B - i_{th})\eta - r_2$$

If the output power error measures in the laser diode power are combined linearly to change each of the current source magnitudes, then the error $\epsilon_1$ and $\epsilon_2$ are each reduced to zero over time. Thus, in general terms, $di/dt = -K\epsilon$ In the present example, K comprises a 2×2 matrix:

$$i = \begin{bmatrix} i_1 \\ i_B \end{bmatrix}$$

$$\varepsilon = \begin{bmatrix} \varepsilon_1 \\ \varepsilon_2 \end{bmatrix}$$

$$\varepsilon = \eta\left(\begin{bmatrix} 1 & 1 \\ R & 1 \end{bmatrix} i - i_{th}\begin{bmatrix} 1 \\ 1 \end{bmatrix}\right) - \begin{bmatrix} r_1 \\ r_2 \end{bmatrix}$$

$$\frac{1}{\eta}\frac{di}{dt} + K\begin{bmatrix} 1 & 1 \\ R & 1 \end{bmatrix} i = K\left(i_{th}\begin{bmatrix} 1 \\ 1 \end{bmatrix} + \frac{1}{\eta}\begin{bmatrix} r_1 \\ r_2 \end{bmatrix}\right)$$

The solution for i thus takes the form:

$$i - i_1 = \left\{I - \exp\left(-\eta K\begin{bmatrix} 1 & 1 \\ R & 1 \end{bmatrix} t\right)\right\}(i_{ss} - i_1)$$

where $i_1$ is the value of i at t=0 and $i_{ss}$ is the steady state value of i at (t→4).

The steady state solution may be expressed as:

$$i_{ss} = \begin{bmatrix} 1 & 1 \\ R & 1 \end{bmatrix}^{-1}\left(i_{th}\begin{bmatrix} 1 \\ 1 \end{bmatrix} + \frac{1}{\eta}\begin{bmatrix} r_1 \\ r_2 \end{bmatrix}\right) = \frac{1}{R-1}\left(i_{th}\begin{bmatrix} 0 \\ R-1 \end{bmatrix} + \frac{1}{\eta}\begin{bmatrix} (r_2 - r_1) \\ R \cdot r_1 - r_2 \end{bmatrix}\right)$$

The stability of the system is dependent upon the behavior of the exponential term in the above equation. However, a uniform rate of convergence may be forced by requiring the matrix K to be equal to k times a nontrivial diagonal matrix, e.g., an identity matrix:

$$K\begin{bmatrix} 1 & 1 \\ R & 1 \end{bmatrix}^{-1} = k\begin{bmatrix} 1 & 0 \\ 0 & 1 \end{bmatrix}$$

$$K = \frac{k}{R-1}\begin{bmatrix} -1 & 1 \\ R & -1 \end{bmatrix}$$

$$\frac{di}{dt} = \frac{-k}{R-1}\begin{bmatrix} -1 & 1 \\ R & -1 \end{bmatrix}\begin{bmatrix} p_1 - r_1 \\ p_2 - r_2 \end{bmatrix}$$

This can be written as the following two scalar equations:

$$\frac{di_1}{dt} = \frac{k}{R-1}(p_1 - p_2 - r_1 + r_2)$$

$$\frac{di_B}{dt} = \frac{-k}{R-1}(R \cdot p_1 - p_2 - R \cdot r_1 + r_2) = \frac{k}{R-1}(p_2 - R \cdot p_1)$$

The above equations may be used to establish and periodically update the magnitudes of current sources in a dual switched current laser diode driver structure. Furthermore, because the ratio of desired laser currents $i_1$ and $i_2$ is fixed by the imposed constraints as previously described, it is necessary to sample only two of the three possible operating states. Keeping with the above example, the system may only sample $p_1$, corresponding to the operating state when VIDEO_1 is active and VIDEO_2 is inactive, and $p_2$, corresponding to the operating state when VIDEO_2 is active and VIDEO_1 is inactive, to maintain control of the system. It is not necessary to sample the third operating state, $p_3=p_1+p_2$, corresponding to the state when VIDEO_1 and VIDEO_2 are both active simultaneously in this example.

Exemplary Hardware Implementation

Figure 5A:
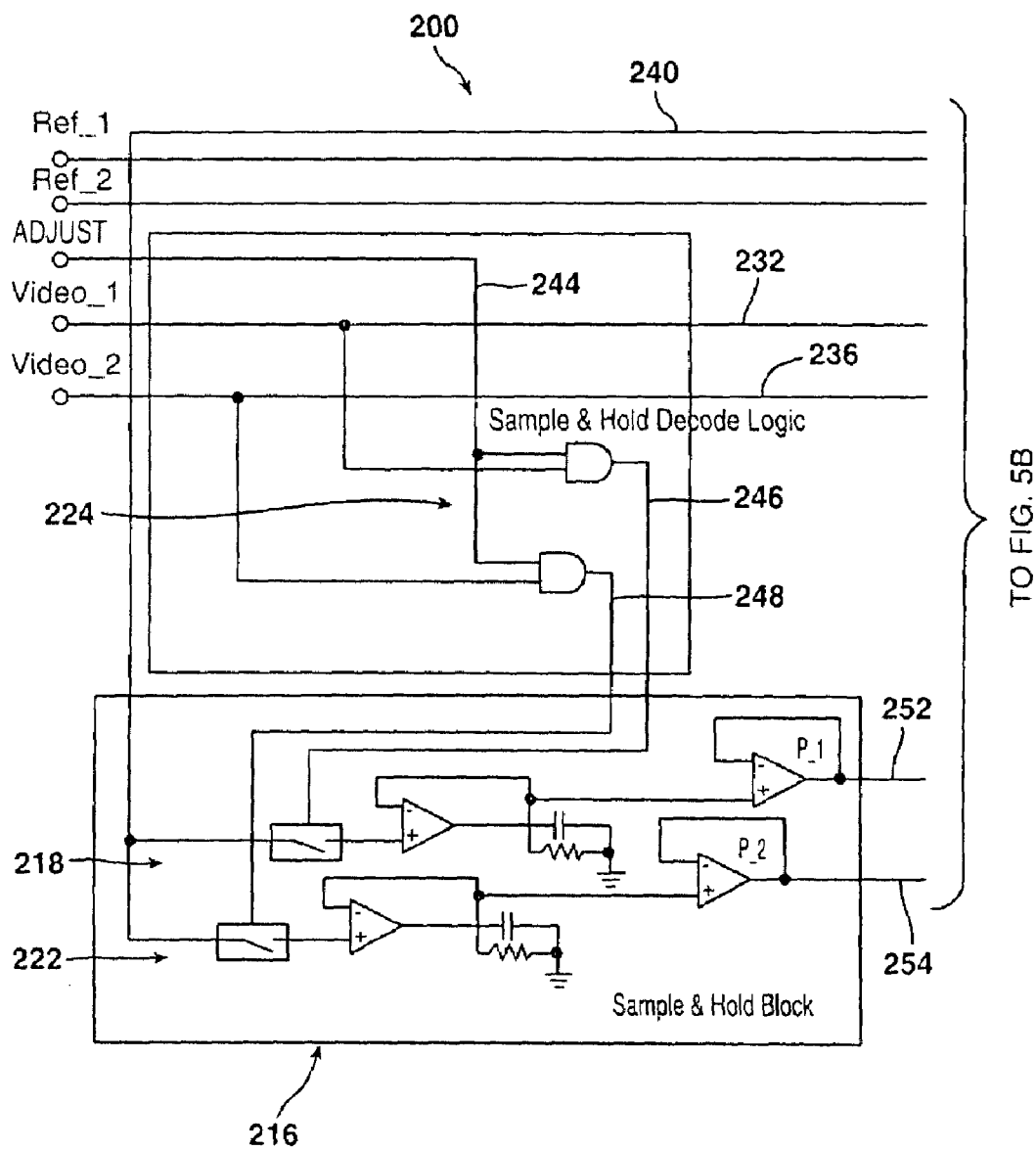
FIG. 5A is a first part of a schematic illustration of an exemplary laser driver circuit for driving a corresponding laser source.
Figure 5B:
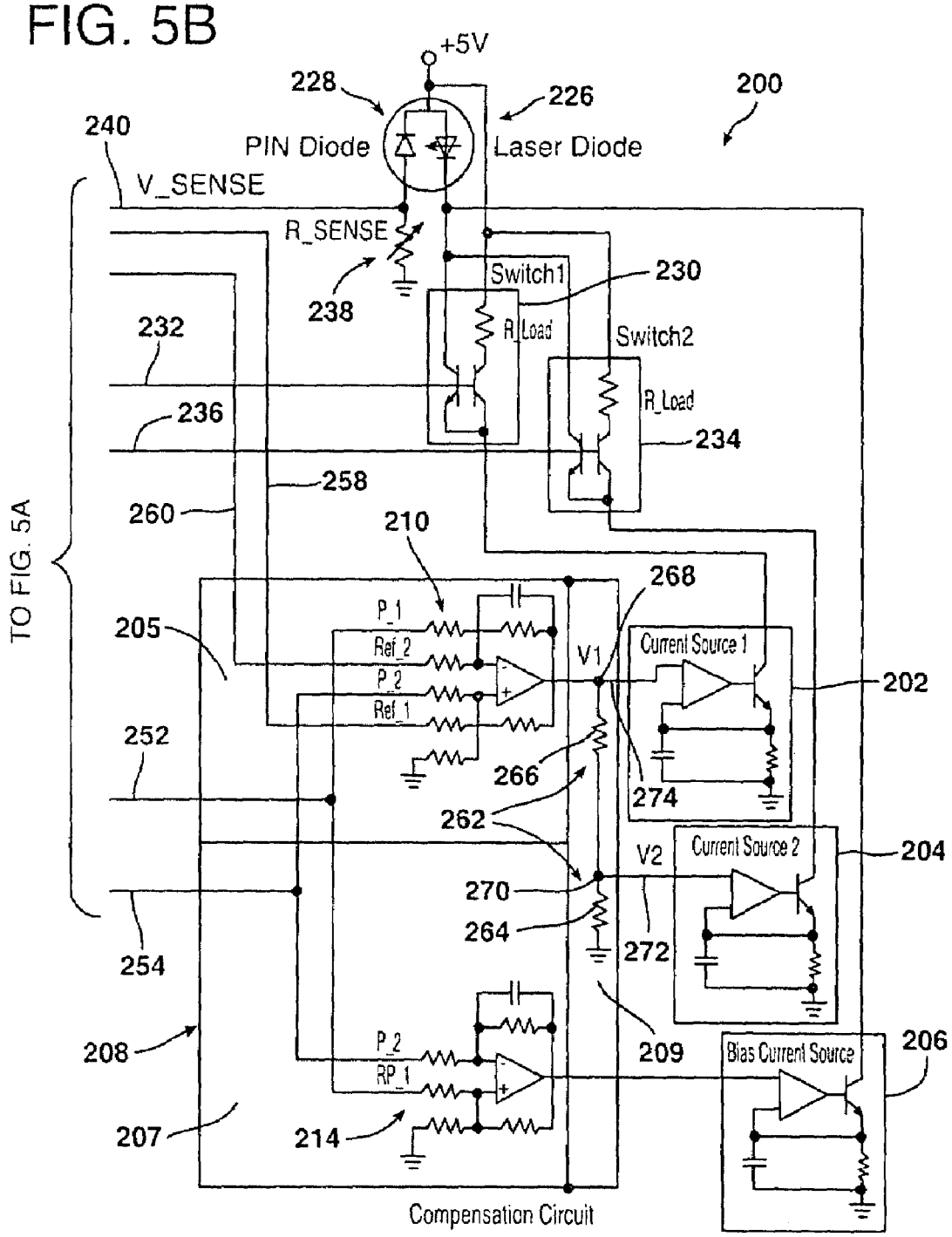
FIG. 5B is the remaining part of the schematic illustration of FIG. 5A.

Referring to FIGS. 5A and 5B, an implementation of a dual switched current source laser diode driver circuit 200 is illustrated. The diode driver circuit 200 may be utilized to implement each of the driver circuits 62C, 62Y, 62M, 62K described with reference to FIG. 2. The laser diode driver circuit 200 comprises two laser drive current sources including a first current source 202 (CURRENT SOURCE 1) and a second current source 204 (CURRENT SOURCE 2), as well as a third current source 206, which is also referred to herein as bias source 206 (BIAS CURRENT SOURCE). The laser driver control circuit 200 performs a calibration operation during a non-printing portion of a laser scan operation as will be described in more detail herein.

The exemplary circuit 200 may perform the calibration operation by sampling actual laser power output for less than all of the operating states in the set of operating states. For example, in the above example, the set of operating states includes three desired laser power output levels corresponding to $p_1$, $p_2$ and $p_3$. However, as described in greater detail above, in the present example, p2 is constrained to a ratiometric function of $p_1$. As such, the system does not need to sample actual laser power for all of the operating states.

The calibration operation further includes computing adjustments to the current levels produced by the first current source 202, the second current source 204 and the bias current source 206 such that the current level produced by the second current source 204 is a ratiometric function of the current level produced by the first current source 202, and the sampled laser power levels converge towards the corresponding desired laser output power levels for the associated operating states. The circuit 200 further adjusts the first and second current sources 202 and 204 and the bias current source 206 to the corresponding computed current levels.

In the illustrated circuit, a compensator, e.g., a compensation block 208 is provided for controlling the current sources 202, 204, 206 and includes a first circuit module 205, a second circuit module 207 and a third circuit module 209. The first circuit module 205 comprises a first compensation circuit 210 that controls the first current source 202. The second circuit module 207 comprises a second compensation circuit 214 to control the bias current source 206. Keeping with the above example, the third circuit module 209 comprises a third compensation circuit to control the second current source 204 such that the current produced by the second current source 204 is a ratiometric function of the current produced by the first current source 202. In the illustrative analog circuit shown, the third circuit module 209 comprises a voltage divider that implements the function of the ratio R.

A sampler, e.g., a sample and hold block 216 outputs control signals that are coupled to the compensation block 208 and comprises a first sample and hold circuit 218 and a second sample and hold circuit 222. The first and second sample and hold circuits 218 and 222 are selected based upon sample and hold decode logic 224.

The laser diode driver circuit 200 is coupled to a laser diode 226 (e.g., one of the laser diodes 56K, 56Y, 56M, 56C described with reference to FIGS. 1-2) and a corresponding PIN diode 228. The anode of the laser diode 226 is coupled to a suitable supply voltage. The first current source 202 is coupled to the cathode of the laser diode 226 via a first switch 230 (SWITCH 1). The first switch 230 is controlled by a signal, designated VIDEO_1, which is carried on the first switch control line 232. When the VIDEO_1 signal is in a first state, the current from the first current source 202 affects the drive current applied to the laser diode 226. When the VIDEO_1 signal is in a second state, the current from the first current source 202 is drawn through the resistive dummy load of the first switch 230 in a manner analogous to that described with reference to the switches 112 in FIG. 3.

Similarly, the second current source 204 is coupled to the cathode of the laser diode 226 via a second switch 234 (SWITCH 2). The second switch 234 is controlled by a signal, designated VIDEO_2, which is carried on the second switch control line 236. When the VIDEO_2 signal is in a first state, the current from the second current source 204 affects the drive current applied to the laser diode 226. When the VIDEO_2 signal is in a second state, the current from the second current source 204 is drawn through the resistive dummy load of the second switch 234 in a manner analogous to that described with reference to the switches in FIG. 3.

The output of the bias current source 206 (BIAS CURRENT SOURCE) couples to the cathode of the laser diode 226. As such, the bias current is always applied to the laser diode 226 regardless of the value of laser modulation data.

When the laser diode 226 is energized, the magnitude of the output power is measured by sensing the current leakage through the back-biased PIN Diode 228. In practice, the PIN diode 228 is typically packaged with the laser diode 226. The current sensed by the PIN diode 228 is converted to a voltage, designated V_SENSE, by a current to voltage converter 238, which may comprise a fixed resistance, variable resistance, programmable resistance, current to voltage amplifier or other suitable device to convert the output current of the PIN diode 228 to a corresponding output voltage V_SENSE. For purposes of illustration, the current to voltage converter 238 is illustrated as a variable resistor, designated R_SENSE. The voltage V_SENSE is carried on a feedback signal line 240 to the first sample and hold circuit 218 and the second sample and hold circuit 222.

The sample and hold decode logic 224 of the laser diode driver circuit 200 receives as inputs, the VIDEO_1 signal carried on the first switch control line 232, the VIDEO_2 signal carried on the second switch control line 236 and an ADJUST signal carried on an adjust signal line 244. The sample and hold decode logic 232 further comprises a first output line 246 that carries a first sample and hold control signal SH_Enable1 and a second output line 248 that carries a second sample and hold control signal SH_Enable2. The implemented logic is shown in the truth table below. Notably, when the ADJUST signal is inactive, the SH_Enable_2 and SH_Enable_1 signals are both inactive. When the ADJUST signal is active and VIDEO_1 is active, then SH_Enable1 is active. When the ADJUST signal is active and VIDEO_2 is active then SH_Enable2 is active. An "X" represents a "don't care" state.

| ADJUST | VIDEO_2 | VIDEO_1 | SH_Enable_2 | SH_Enable_1 |
|--------|---------|---------|-------------|-------------|
| 0 | X | X | 0 | 0 |
| 1 | 0 | 0 | 0 | 0 |
| 1 | 0 | 1 | 0 | 1 |
| 1 | 1 | 0 | 1 | 0 |

The first output line 246 of the sample and hold decode logic 224 is coupled to a control circuit, e.g., a switch, of the first sample and hold circuit 218 such that the SH_Enable1 signal switches the first sample and hold circuit 218 between a first and second state. The first sample and hold circuit 218 samples the value of the V_SENSE signal when in the first state and holds its previously sampled value of V_SENSE when in the second state. The first sample and hold circuit 218 further outputs a first sample and hold output signal P_1 on a first sample and hold output line 252 to the compensation circuit 208 as will be described in greater detail below.

The second output line 248 of the sample and hold decode logic 224 is coupled to a control circuit, e.g., a switch, of the second sample and hold circuit 220 such that the SH_Enable1 signal switches the second sample and hold circuit 220 between a first and second state. In a manner analogous to the first sample and hold circuit 218, the second sample and hold circuit 220 samples the value of the V_SENSE signal when in the first state and holds its previously sampled value of V_SENSE when in the second state. The second sample and hold circuit 220 further outputs a second sample and hold output signal P_2 on a second sample and hold output line 254 to the compensation circuit 208 as will be described in greater detail below.

The first sample and hold output P_1 is a measure of the actual power output by the laser diode 226 corresponding to the first operating state, i.e., when the first current source 202 and the bias current source 206 are applied to the cathode of the laser diode 226 (and the second current source 204 is turned off). Similarly, the second sample and hold output P_2 is a measure of the actual power output by the laser diode 226 corresponding to the second operating state, i.e., when the second current source 204 and the bias current source 206 are applied to the cathode of the laser diode 226 (and the first current source 202 is turned off).

The first compensation circuit 210 receives a REF_1 input signal carried on a first reference line 258 and a REF_2 input signal carried on a second reference line 260. The first compensation circuit 210 also receives as inputs, the sample and hold output signals P_1 and P_2. The second compensation circuit 214 receives as inputs the sample and hold output signals RP_1 and P_2. In this regard, the expression RP_1 may be implemented in the analog domain by providing the sample and hold output signal P_1 to the second compensation circuit 214 in such a manner that it is scaled by the value R, e.g., by adjusting the gain setting resistors surrounding the operational amplifier input and/or feedback paths.

The REF_1 signal is a control signal, e.g., as provided by the controller 12, that represents a measure of the desired output power of the laser diode 226 when the first current source 202 and the bias current source 206 are applied to the cathode of the laser diode 226 (and the second current source 204 is turned off). Similarly, the REF_2 signal is a control signal, e.g., as provided by the controller 12, that represents a measure of the desired output power of the laser diode 226 when the second current source 204 and the bias current source 206 are applied to the cathode of the laser diode 226 (and the first current source 202 is turned off).

The first compensation circuit 210 implements equation $$\frac{di_1}{dt} = \frac{k}{R-1}(p_1 - p_2 - r_1 + r_2).$$

Using the above described variables the equation corresponds to $$\frac{di_1}{dt} = \frac{k}{R-1}(P\_1 - P\_2 - REF\_1 + REF\_2).$$

As shown, P_1 and REF_2 couple to an inverting input of the first compensation circuit 210 and P_2 and REF_1 couple to a non-inverting input of the first compensation circuit 210.

The second compensation circuit 214 implements equation $$\frac{di_B}{dt} = \frac{k}{R-1}(p_2 - R \cdot p_1).$$

Using the above described variables the equation corresponds to $$\frac{di_B}{dt} = \frac{k}{R-1}(P\_2 - R \cdot P\_1).$$

In this regard, the first and second compensation circuits 210 and 214 may implement their respective equations, including the computation of their scalar gain values k and R, using an appropriate selection of resistors, capacitors and other necessary electrical components in an operational amplifier circuit. Moreover, the first and second compensation circuits 210 and 214 are shown in a simplified form for sake of discussion herein. In application, the first and second compensation circuits 210 and 214 may include other components such as inverters, amplifiers, etc., to further scale and/or adjust the magnitude and or polarity of the output or input component signals, such as may be necessary to implement the specific equations used to characterize the control and calibration system.

In the exemplary circuit illustrated in FIGS. 5A and 5B, the output of the first compensation circuit 210 is connected to the third circuit module 209. As illustrated, the third circuit module 209 comprises a voltage divider circuit 262 comprising a first resistor 264 and a second resistor 266. The voltage divider circuit 262 converts the output voltage produced by the first compensation circuit 210 into a first current source control voltage $V_1$ at point 268 and a second current source control voltage $V_2$ at point 270. The first current source control voltage $V_1$ is provided as an input to the first current source 202 by connecting point 268 to the input of the first current source 202 with a conductor 274. Similarly, the second current source control voltage $V_2$ is provided as an input to the second current source 204 by connecting point 270 to the input of the second current source 204 with a conductor 272. In this fashion, the current produced by the first current source 202 is proportional to the first current source control voltage $V_1$ and the current produced by the second current source 204 is proportional to the second current source control voltage $V_2$. Moreover, the first current source control voltage $V_1$ and the second current source control voltage $V_2$ are related by the ratio defined by the voltage divider circuit 262. Thus, the ratio of the currents produced by the first current source 202 and the second current source 204 may be defined by the values of the first and second resistors 264 and 266.

As previously discussed, when the bias current $i_B$ is set equal to the threshold current $i_{th}$, R is equal to the ratio of currents between when VIDEO_2 is active and VIDEO_1 is inactive, i.e., the current produced by the second current source 204, and when VIDEO_1 is active and VIDEO_2 is inactive, i.e., the current produced by the first current source 202. In the circuit illustrated in FIGS. 5A and 5B, the values of first resistor 264 and the second resistor 266 are chosen such that a ratio of the value of the first resistor 264 to the sum of the values of the first resistor 264 and the second resistor 266 corresponds to the ratio of the current produced by the second current source 204 when VIDEO_2 is active and VIDEO_1 is inactive and the current produced by the first current source 202 when VIDEO_1 is active and VIDEO_2 is inactive. Thus:

$$\frac{R_1}{R_1 + R_2} \cong \frac{i_2}{i_1}$$

where $R_1$ is equal to the value of the first resistor 264, $R_2$ is equal to the value of the second resistor 266 and $i_B$ is equal to $i_{th}$.

As illustrated, the voltage divider circuit 262 comprises fixed resistors 264 and 266 but other suitable devices for converting the output current produced by the first compensation circuit 210 into the first and second current source voltages $V_1$ and $V_2$ may be used. For example, the voltage divider circuit 262 could comprise one or more variable resistors, programmable resistors or other suitable devices in place of one or both of the fixed resistors 264 and/or 266. Furthermore, depending upon the particular implementation of the exemplary circuit illustrated in FIGS. 5A and 5B, including the first and second sample and hold circuits 218 and 222, the first and second compensation circuits 210 and 214, the first and second current sources 202 and 204 and the bias current source 206, additional circuitry, for example, inverting circuits, buffer circuits, filtering circuits, etc., may be utilized.

In yet another illustrative example, the values of emitter resistors in the first and second current sources 202 and 204 may be selected so as to define the ratio of the currents produced by the first and second current sources 202 and 204. For example, by choosing a value for the emitter resistor in the first current source 202 equal to $R_{e1}$ the desired ratio of currents produced by the first and second current sources 202 and 204 may be defined by choosing a value for the emitter resistor in the second current source 204 equal to $$\frac{R_{e1}}{\frac{i_2}{i_1}}$$

In this example the voltage divider 262 may not be needed and the output of the first compensation circuit 210 may be connected directly to the inputs of both the first and second current sources 202 and 204.

Figure 6:
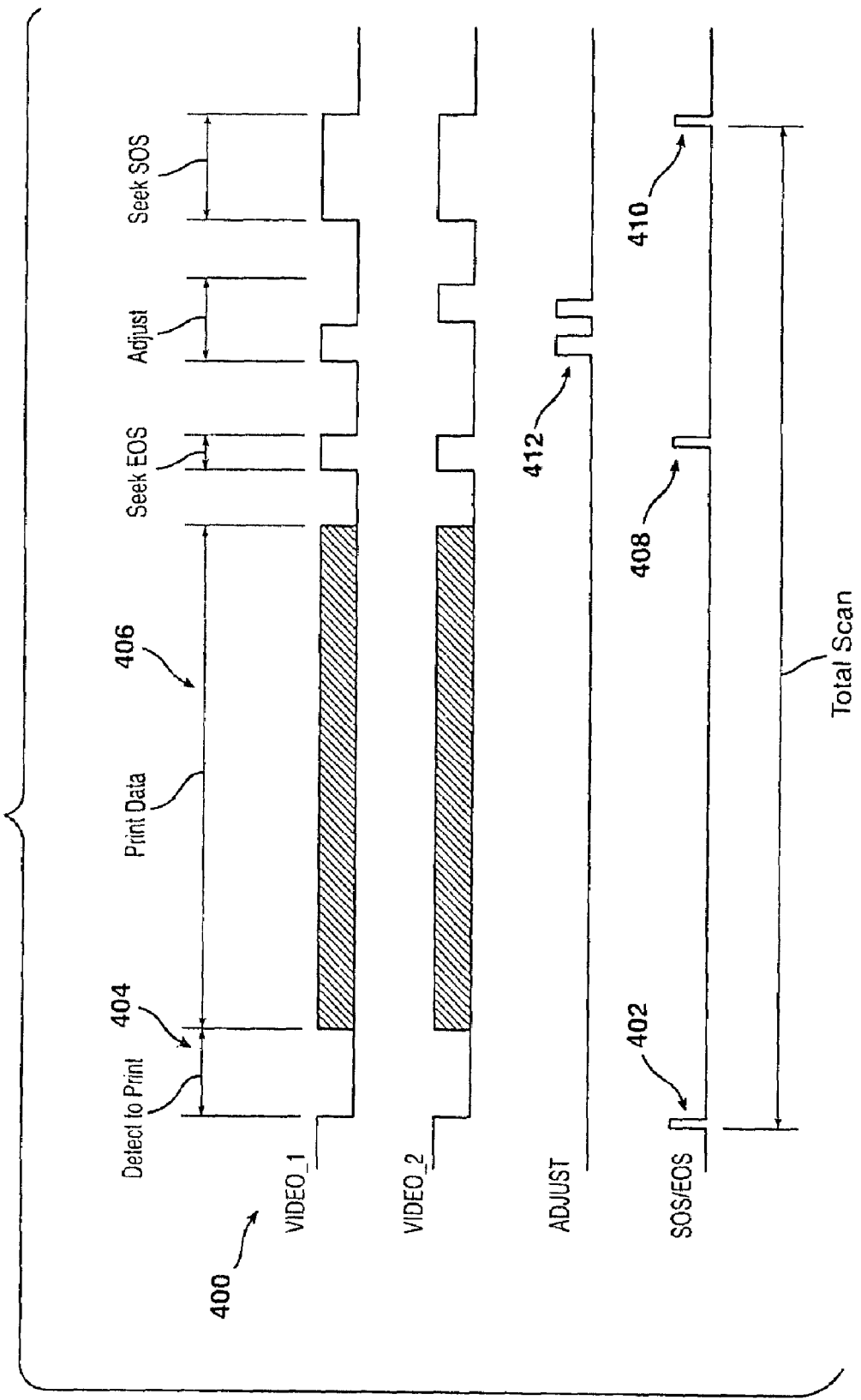
FIG. 6 is a timing diagram of a control sequence which may be used to calibrate the laser driver illustrated in FIGS. 5A and 5B.

The sampling of the laser power at each of the various laser power states, e.g., VIDEO_1 OFF and VIDEO_2 ON; and VIDEO_1 ON and VIDEO_2 OFF, may be performed during the non-printing portion of each scan line. With reference to FIG. 6, a timing diagram 400 illustrates several exemplary timing control signals during a typical scan. The scan begins when a start of Scan (SOS) sensor detects the laser beam as designated by an SOS/EOS pulse output at 402. As shown, both the VIDEO_1 and VIDEO_2 signals are active during start of scan detection so that the laser beam is turned ON as it is swept across the corresponding SOS detector. However, any suitable method may be used to detect the start of scan sensor. The laser is then turned OFF (both VIDEO_1 and VIDEO_2 are inactive) for some time designated as Detect to Print at 404 until the laser beam is over the print margin.

At this point, the laser modulation data for the scan line controls both Video signals (VIDEO_1 and VIDEO_2) to selectively turn on and off each current source CURRENT_SOURCE_1 and CURRENT_SOURCE_2, depending upon the print requirements, as a line of print data is written to the photoconductive surface at 406. Keeping with the above-example, each written ON PEL may assume one of three operating states in the defined set of states including an ON state driven by CURRENT_SOURCE_1, an ON state driven by CURRENT_SOURCE_2, or an ON state driven by CURRENT_SOURCE_1 and CURRENT_SOURCE_2. Additionally, an OFF PEL may define an OFF state or fourth total available state where the laser source is modulated off. In terms of laser output power, each written PEL may be written at a first power level P_1, corresponding to the state when the laser diode 226 is driven by the first current source 202, a second power level P_2, corresponding to a state when the laser diode 226 is driven by the second current source 204, and a third power level P_3, corresponding to a state when the laser diode 226 is driven by both the first current source 202 and the second current source 204. Thus, the third power level P_3 is equal to a sum of the first power level P_1 and the second power level P_2.

At the opposite print margin, the laser beam is turned off. Just before the laser beam reaches the end-of-scan (EOS) sensor, the laser beam is turned back ON again, e.g., by asserting the VIDEO_1 and/or VIDEO_2 signals, or by using any other suitable method to detect the end of scan sensor. When the end of scan is detected, the laser beam has swept past the image area of the photoconductive drum and an SOS/EOS pulse is asserted at 408.

Referring generally to FIGS. 5A, 5B and 6, at some point between EOS at 408 and a subsequent SOS operation at 410, a power adjustment (calibration) cycle may be performed at 412. During the power adjustment cycle, one or more of the first, second or third current sources 202, 204, 206 is calibrated. For example to calibrate each of the first, second and third current sources 202, 204, 206, the ADJUST signal provides two calibration pulses at 412. During each pulse, a select one of the first or second video signals (VIDEO_1, VIDEO_2) is also active. As such, the sample and hold outputs P_1 or P_2 are correspondingly calibrated.

As shown in the exemplary timing diagram, when the first ADJUST pulse is active, the VIDEO_1 signal is active and the VIDEO_2 signal is inactive. Thus, the current through the laser diode 226 is $I_{diode}=I_{Bias}+I_1$. The laser diode output is measured by the PIN diode 228. The sample and hold decode logic 224 activates the first sample and hold circuit 218 of the sample and hold block 216 to sample the V_SENSE signal. The power level P_1 is thus determined based upon the present output level $I_{\_1}$ of the first current source 202.

When the second ADJUST pulse is active, the VIDEO_1 signal is inactive and the VIDEO_2 signal is active. Thus, the current through the laser diode 226 is $I_{diode}=I_{Bias}+I_2$. The laser diode output is measured by the PIN diode 228. The sample and hold decode logic 224 activates the second sample and hold circuit 222 of the sample and hold block 216 to sample the V_SENSE signal. The power level P_2 is thus determined based upon the present output level $I_{\_2}$ of the second current source 204. After the adjustment cycle, the laser diode is ready to be turned off, then turned back on again to start searching for the next start of scan signal.

Figure 7A:
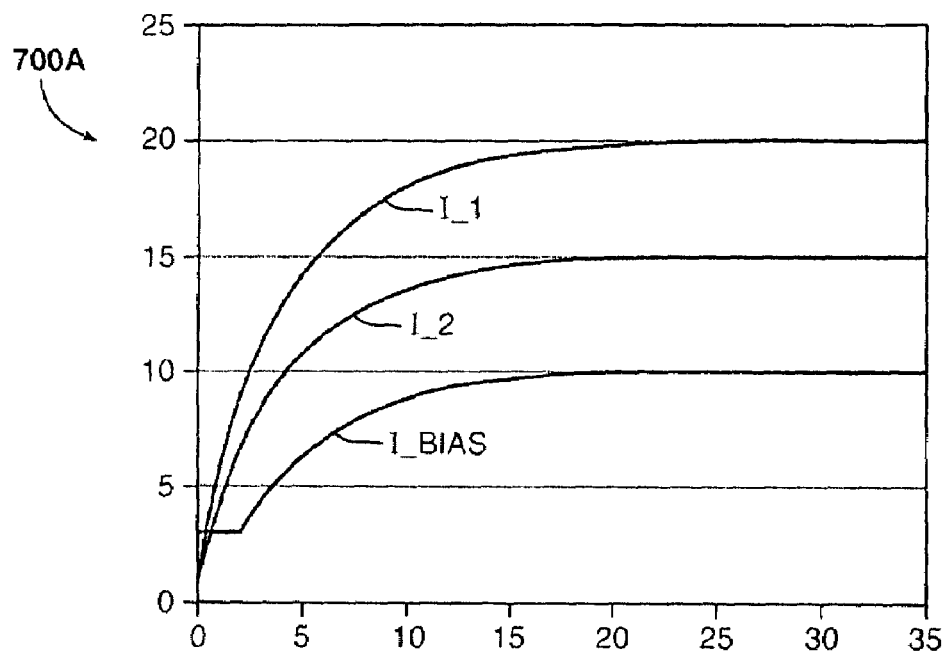
FIG. 7A is a plot of simulated data showing the laser driver currents of the system of FIGS. 5A and 5B converging over time.
Figure 7B:
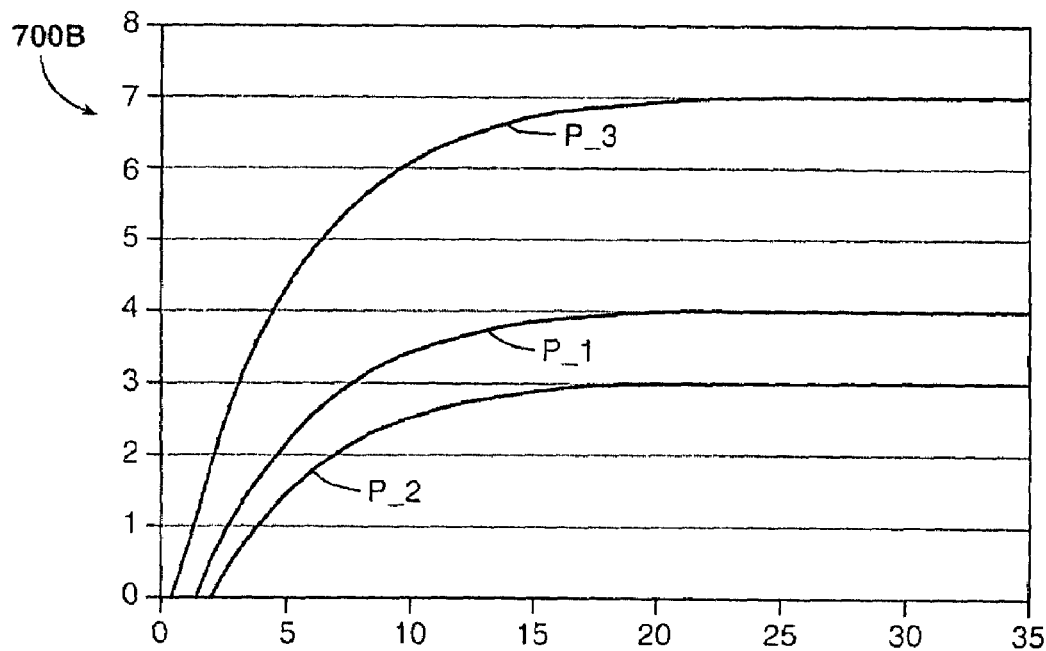
FIG. 7B is a plot of simulated data showing the laser output powers of the system of FIGS. 5A and 5B converging over time.

With reference to FIGS. 7A and 7B, diagrams 700A and 700B illustrate simulated transient response plots of the circuit of FIGS. 5A and 5B showing convergence of the current sources 202, 204, 206 and of the sample and hold block outputs P_1 and P_2. Over a period of time, the first compensation circuit 210 adjusts the level of current delivered by the first current source 202 such that the actual power output of the laser diode 226 corresponds to the input control signal REF_1 based upon inputs REF_1, REF_2, P_1 and P_2, as well as any scalar gain adjustments, e.g., the values k and R in the above example. Similarly, the first compensation circuit 210 adjusts the level of current delivered by the second current source 204 such that the actual power output of the laser diode 226 corresponds to the input control signal REF_2, based upon inputs REF_1, REF_2, P_1 and P_2, as well as any scalar gain adjustments, e.g., the values k and R in the above example. The second compensation circuit 214 adjusts the level of current delivered by the bias current source 206 to correspond to the threshold current $I_{th}$ based upon inputs P_2 and RP_1, as well as any scalar gain adjustments, e.g., the values k and R in the above example. As such, the bias current source 206 is updated as well as the first and second (drive) current sources 202, and 204.

Although discussed with reference to a hardware implementation in FIGS. 5A and 5B for purposes of illustration and clarity of discussion, the systems and methods herein can also be performed in software, or in a combination of hardware and software. For example, the controller may comprise any combination of hardware and/or software processing that replaces functions of the laser driver described with reference to FIGS. 5A and 5B, such as the compensation circuit 208, the sample and hold block 216 and/or the sample and hold decode logic 224. The hardware and/or software may also comprise a separate ASIC, PIC, microcontroller or other processing device on the printhead circuitry 40, or a separate processor or processing logic located elsewhere in the apparatus 10.

For example, the printhead circuitry 40 may comprise a processor that outputs a first signal, a second signal and a third signal, e.g., a pulse width modulated signals that are filtered/converted to correspondingly control the first current source 202, the second current source 204 and the bias current source 206. Under this arrangement, the output of the first and second current sources 202, 204 are coupled to respective switches 230 and 234 substantially as described with reference to FIGS. 5A and 5B. Further, the bias current source 206 and the switches 230 and 234 couple to the laser diode 226 substantially as described with reference to FIGS. 5A and 5B.

In this exemplary embodiment, the output current of the PIN diode 228 is converted to the V_SENSE signal by the current to voltage converter 238. The V_SENSE signal is fed back to the controller on a suitable control line and may optionally be buffered, scaled, filtered, etc. The desired laser power reference signals REF_1 and REF_2 may be digital values stored in respective registers or other memory associated with the controller. Moreover, the scalar values for k and/or R may be stored in respective registers or other memory associated with the controller. The controller computes the appropriate current drive signals for the first and second current sources 202, 204, as well as for the bias current source 206, based upon the equations:

$$\frac{di_1}{dt} = \frac{k}{R-1}(p_1 - p_2 - r_1 + r_2); \frac{di_B}{dt} = \frac{k}{R-1}(p_2 - R \cdot p_1); \text{ and } i_2 = Ri_1.$$

Under this arrangement, it is also possible for the controller to periodically vary the constants k and/or R to further accommodate changing laser characteristics.

Figure 8:
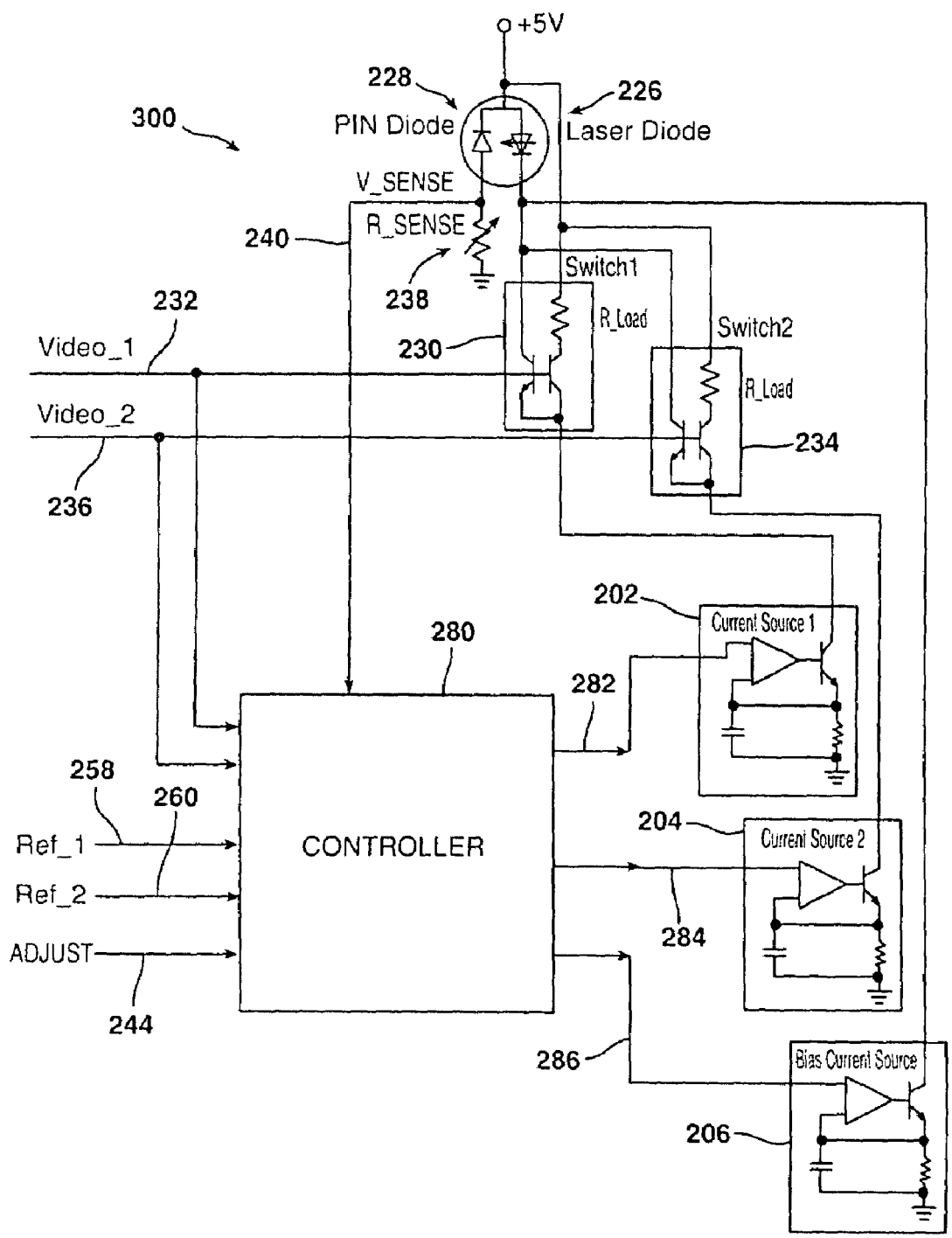
FIG. 8 is a schematic illustration of another exemplary laser driver circuit for driving a corresponding laser source.

For example, FIG. 8 illustrates an exemplary dual switched current source laser diode driver circuit 300 in accordance with another aspect of the present invention wherein the first and second current sources and the bias current source are controlled by a controller 280, e.g., a PIC, microcontroller or other processor logic, which may be provided as part of the control electronics on the printhead circuitry. The exemplary circuit 300 illustrated in FIG. 8 is similar to the circuit illustrated in FIGS. 5A and 5B except as set out below and like elements are referred to with like reference numerals.

As illustrated in FIG. 8, the controller 280 may perform some or all of the functions of the first and second compensation circuits 210 and 214, the voltage divider 262, the first and second sample and hold circuits 218 and 222 and the sample and hold decode logic 224 of the circuit 200 shown in FIGS. 5A and 5B in addition to other functions. The controller 280 computes the appropriate current drive signals for the first and second current sources 202, 204, as well as for the bias current source 206, based upon the equations:

$$\frac{di_1}{dt} = \frac{k}{R-1}(p_1 - p_2 - r_1 + r_2); \frac{di_B}{dt} = \frac{k}{R-1}(p_2 - R \cdot p_1); \text{ and } i_2 = Ri_1$$

For example, the controller 280 may output laser power control signals 282, 284 and 286 that determines the desired laser output power for the first and second current sources 202 and 204 and the bias current source 206, respectively. The output laser power control signals 282, 284 and 286 may be pulse width modulated signals, which are used to establish input control voltages to the first and second current sources 202 and 204 and the bias current source 206. Alternatively, the controller 280 may utilize a digital-to-analog converter that is internal or external to the controller 280 to establish input control voltages to the first and second current sources 202 and 204 and the bias current source 206 based upon multi-bit digital data. In similar fashion, any suitable configuration may be utilized such that the controller 280 may control the current sources such that the current produced by each corresponds to the desired level of laser output power in accordance with the formulas provided above.

Though not shown in FIG. 8, appropriate associated circuitry, for example, circuitry for analog-to-digital conversion, digital-to analog-conversion, buffering, scaling, filtering, etc., may also be used.

The laser diode driver circuits 200 and 300 are illustrated for the case of two programmable laser drive sources and a bias current source 202, 204, 206. Other numbers of drive sources and bias current sources may alternatively be utilized as set out in greater detail herein. Additionally, ratios other than or in addition to ratio R, may be set to establish other relationships between other desired laser output power levels.

The various aspects of the present invention may be utilized in binary printers, e.g., to compensate for bow, skew and other processing position errors, such as using Pel synthesis as set out in U.S. Pat. No. 7,123,282, entitled "Method And Apparatus For Minimizing Visual Artifacts In Images Generated By An Electrophotographic Machine", to the same assignee, which is hereby incorporated by reference in its entirety. The various aspects of the present invention may also be used to control the size and/or total energy of each written Pel, e.g., such as when performing halftoning, scan line position compensation, etc. Numerous other uses are well within the spirit of the various aspects of the present invention.

As will be appreciated by one of skill in the art, the various aspects of the present invention may be embodied as a method, system, or computer program product. Moreover, the various aspects of the present invention may take the form of an entirely hardware embodiment or an embodiment combining software and hardware aspects.

The present invention is described herein with reference to schematics, flowchart illustrations and/or block diagrams of methods and apparatus systems according to embodiments of the invention. It will be understood that each block of the flowchart illustrations and/or block diagrams, and combinations of blocks in the flowchart illustrations and/or block diagrams may also be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The equations in the specification and the flowcharts and block diagrams in the Figures illustrate the architecture, functionality, and operation of possible implementations of systems, methods and computer program products according to various embodiments of the present invention. In this regard, each equation or block in the flowchart or block diagrams may represent a module, segment, or portion of code, which comprises one or more executable instructions for implementing the specified logical function(s). It should also be noted that, in some alternative implementations, the functions might occur out of the order as presented herein. For example, two blocks shown in succession may, in fact, be executed substantially concurrently, or the blocks may sometimes be executed in the reverse order, depending upon the functionality involved. It will also be noted that each equation in the specification, and each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. For example, the various aspects of the present invention may be implemented in a copier, facsimile machine, multi-function machine, or other suitable structure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Having thus described the invention of the present application in detail and by reference to preferred embodiments thereof, it will be apparent that modifications and variations are possible without departing from the scope of the invention defined in the appended claims.

What is claimed is:

1. A method of controlling a printhead comprising:
providing a laser source;
providing a plurality of current sources coupled to said laser source including at least a bias current source, a first drive current source and a second drive current source;
defining a set of operating states where each operating state corresponds to a desired laser output power level set by driving said laser source using a corresponding combination of said plurality of current sources;
setting a ratio that establishes a relationship between a first one of said desired laser output power levels and a second one of said desired laser output power levels; and
performing a calibration operation by:
sampling actual laser output power of said laser source for less than all of said operating states in said set;
computing adjustments to the current levels of said plurality of current sources such that the current level of said second drive current source relates to the current level of said first drive current source based upon a function of said ratio and for each operating state that is sampled, the sampled laser power level converges towards a corresponding one of said desired laser output power levels associated with that sampled operating state; and
adjusting said plurality of current sources including said bias current source, said first drive current source and said second drive current source to their corresponding computed current levels.

2. The method according to claim 1, wherein said defining a set of operating states comprises defining said set as having three operating states including:
a first operating state corresponding to a first desired laser output power level where said combination of first and second drive current sources is set by said first drive current source on and said second drive current source off;
a second operating state corresponding to a second desired laser output power level where said combination of first and second drive current sources is set by said first drive current source off and said second drive current source on; and
a third operating state corresponding to a third desired laser output power level where said combination of first and second current sources is set by said first drive current source on and said second drive current source on.

3. The method according to claim 2, wherein said sampling actual laser output power of said laser source for less than all of said operating states in said set comprises sampling only for said first and second operating states.

4. The method according to claim 1, wherein said setting a ratio comprises:
defining said first one of said desired laser output power levels corresponding to setting said first drive current source on and said second drive current source off; and
defining said second one of said laser output power levels corresponding to setting said first drive current source off and said second drive current source on.

5. The method according to claim 1, wherein said performing a calibration operation comprises:
iteratively repeating said sampling, computing and adjusting operations during a non-printing portion of a scan operation until an error measure characterizing a difference between said sampled laser power level and said corresponding desired laser output level for each sampled operating state converge substantially towards zero.

6. The method according to claim 1, wherein said performing a calibration operation comprises:
adjusting said bias current level to correspond to a laser threshold current level of said laser source.

7. The method according to claim 1, wherein said computing adjustments to the current levels of said plurality of current sources comprises:
computing adjustments to the current level of said bias current source by implementing the equation:

$$\frac{di_B}{dt} = \frac{k}{R-1}(p_2 - R \cdot p_1)$$

computing adjustments to the current level of said first drive current source by implementing the equation:

$$\frac{di_1}{dt} = \frac{k}{R-1}(p_1 - p_2 - r_1 + r_2)$$

and
computing adjustments to the current level of said second drive current source by implementing the equation:

$$i_2 = R i_1$$

wherein k is a scalar constant, $p_1$ is a first sample of laser output power corresponding to a first one of said operating states, $p_2$ is a second sample of laser output power corresponding to a second one of said operating states, R is said ratio, $r_1$ corresponds to said desired laser output power at said first operating state, $r_2$ corresponds to said desired laser output power at said second operating state, $i_1$ is the adjusted current level of said first drive current source and $i_2$ is the adjusted current level of said second drive current source.

8. A system for controlling a printhead comprising:
a laser source;
a plurality of current sources coupled to said laser source including at least a bias current source, a first drive current source and a second drive current source;
a controller that:
controls said plurality of current sources during imaging operations to write print elements corresponding to associated image data and a set of operating states where each operating state corresponds to a desired laser output power level set by driving said laser source using a corresponding combination of said plurality of current sources; and performs a calibration operation during a non-printing portion of a scan operation that:

samples actual laser output power of said laser source for less than all of said operating states in said set;

computes adjustments to the current levels of said plurality of current sources such that the current level of said second drive current source is a ratiometric function of the current level of said first drive current source and for each operating state that is sampled, the sampled laser power level converges towards a corresponding one of said desired laser output power levels associated with that sampled operating state; and adjusts said plurality of current sources including said bias current source, said first drive current source and said second drive current source to their corresponding computed current levels.

9. The system according to claim 8, further comprising:

a first switch coupled between said laser source and said first drive current source, having a first switch control terminal;

a first control signal coupled between said controller and said first switch control terminal, said first control signal controlling said first switch to selectively couple said first drive current source to said laser source or a first dummy load;

a second switch coupled between said laser source and said second drive current source, having a second switch control terminal;

a second control signal coupled between said controller and said second switch control terminal, said second control signal controlling said second switch to selectively couple said second drive current source to said laser source or a second dummy load;

a third control signal coupled between said controller and said bias current source through which said controller programmably adjusts the current level of said bias current source;

a fourth control signal coupled between said controller and said first drive current source through which said controller programmably adjusts the current level of said first drive current source; and a fifth control signal coupled between said controller and said second drive current source through which said controller programmably adjusts the current level of said second drive current source.

10. The system according to claim 8, wherein said controller comprises a programmed microcontroller.

11. The system according to claim 8, wherein said controller further comprises:

a sample and hold circuit to sample and store said samples of actual laser output power of said laser source for less than all of said operating states in said set;

sample and hold decode logic to select a particular operating state to collect sample data; and a compensation circuit that computes said adjustments to the current levels of said plurality of current sources.

12. The system according to claim 11, wherein said compensation circuit comprises:

a first circuit module that calculates the adjusted current level for said first drive current source;

a second circuit module that calculates the adjusted current level for said bias current source; and a third circuit module that provides the adjusted current level for said second drive current source by scaling the adjusted current level of said first laser source by a predetermined ratio.

13. The system according to claim 12, wherein said third circuit module comprises a voltage divider that divides a value of a control signal coupled to said first drive current source.

14. The system according to claim 8, wherein said controller iteratively samples, computes and adjusts during said calibration operation until an error measure characterizing a difference between said sampled laser power level and said corresponding desired laser output power level for each sampled operating state converge substantially towards zero.

15. The system according to claim 8, wherein said bias current level is adjusted during said calibration operation to correspond to a laser threshold current level of said laser source.

16. The system according to claim 8, wherein:

adjustments to the current level of said bias current source are implemented by the equation:

$$\frac{di_B}{dt} = \frac{k}{R-1}(p_2 - R \cdot p_1)$$

adjustments to the current level of said first drive current source are implemented by the equation:

$$\frac{di_1}{dt} = \frac{k}{R-1}(p_1 - p_2 - r_1 + r_2)$$

and adjustments to the current level of said second drive current source are implemented by the equation:

$$i_2 = R i_1$$

wherein k is a scalar constant, $p_1$ is a first sample of laser output power corresponding to a first one of said operating states, $p_2$ is a second sample of laser output power corresponding to a second one of said operating states, R is said ratio, $r_1$ corresponds to said desired laser output power at said first operating state, $r_2$ corresponds to said desired laser output power at said second operating state, $i_1$ is the adjusted current level of said first drive current source and $i_2$ is the adjusted current level of said second drive current source.

17. A control system for controlling laser power in a printhead comprising:

a first memory for storing a set of operating states where each operating state corresponds to a stored value designating a desired laser output power level set by driving a laser source using a corresponding combination of current sources selected from a plurality of current sources including at least a bias current source, a first drive current source and a second drive current source;

a processor that performs a calibration operation that:

requests samples of actual laser output power of said laser source for less than all of said operating states in said set;

stores received sample data in a second memory;

computes adjustments to the current levels of said plurality of current sources such that the current level of said second drive current source is a ratiometric function of the current level of said first drive current source and for each operating state that is sampled, the stored sample data in said second memory converges towards a corresponding one of said desired laser output power levels associated with that sampled operating state; and outputs a control signal to adjust said plurality of current sources including said bias current source, said first drive current source and said second drive current source to their corresponding computed current levels.

18. The control system according to claim 17, wherein said processor iteratively samples, computes and adjusts during said calibration operation until an error measure characterizing a difference between said sampled laser power level and said corresponding desired laser output power level for each sampled operating state converge substantially towards zero.

19. The control system according to claim 17, wherein said bias current level is adjusted during said calibration operation to correspond to a laser threshold current level of said laser source.

20. The system according to claim 8, wherein:

adjustments to the current level of said bias current source are implemented by the equation:

$$\frac{di_B}{dt} = \frac{k}{R-1}(p_2 - R \cdot p_1)$$

adjustments to the current level of said first drive current source are implemented by the equation:

$$\frac{di_1}{dt} = \frac{k}{R-1}(p_1 - p_2 - r_1 + r_2)$$

and adjustments to the current level of said second drive current source are implemented by the equation:

$$i_2 = R i_1$$

wherein k is a scalar constant, $p_1$ is a first sample of laser output power corresponding to a first one of said operating states, $p_2$ is a second sample of laser output power corresponding to a second one of said operating states, R is said ratio, $r_1$ corresponds to said desired laser output power at said first operating state, $r_2$ corresponds to said desired laser output power at said second operating state, $i_1$ is the adjusted current level of said first drive current source and $i_2$ is the adjusted current level of said second drive current source.

* * * * *